US012560490B2

(12) United States Patent
Angelov et al.

(10) Patent No.: US 12,560,490 B2
(45) Date of Patent: Feb. 24, 2026

(54) METHOD FOR DETERMINING A TEMPERATURE OF AN IGBT DRIVER

(71) Applicant: MAHLE International GmbH, Stuttgart (DE)

(72) Inventors: Tihomir Angelov, Ludwigsburg (DE); Marvin Derschka, Remseck am Neckar (DE); Volker Kirschner, Muehlacker (DE); Hans Christian Uibeleisen, Backnang (DE)

(73) Assignee: Mahle International GmbH (DE)

( * ) Notice: Subject to any disclaimer, the term of this patent is extended or adjusted under 35 U.S.C. 154(b) by 392 days.

(21) Appl. No.: 18/119,820

(22) Filed: Mar. 9, 2023

(65) Prior Publication Data

US 2023/0288268 A1 Sep. 14, 2023

(30) Foreign Application Priority Data

Mar. 10, 2022 (DE) ..................... 10 2022 202 413.3

(51) Int. Cl.
*G01K 7/16* (2006.01)
(52) U.S. Cl.
CPC ........... *G01K 7/16* (2013.01); *G01K 2217/00* (2013.01)
(58) Field of Classification Search
None
See application file for complete search history.

(56) References Cited

U.S. PATENT DOCUMENTS

| | | | |
|---|---|---|---|
| 2014/0015005 A1* | 1/2014 | Ishii ..................... | H10D 84/403 |
| | | | 257/296 |
| 2019/0190369 A1* | 6/2019 | Nakamori .............. | H03K 17/14 |
| 2021/0028721 A1* | 1/2021 | Strahm .................. | H02M 1/12 |

FOREIGN PATENT DOCUMENTS

DE 102014204648 A1 9/2015

OTHER PUBLICATIONS

English abstract for DE-102014204648.

* cited by examiner

*Primary Examiner* — Erica S Lin
(74) *Attorney, Agent, or Firm* — Fishman Stewart PLLC

(57) ABSTRACT

A method for determining a temperature of an Insulated-Gate Bipolar Transistor ("IGBT") driver, the IGBT driver may include two Metal-Oxide-Semiconductor Field-Effect Transistor ("MOSFET") elements, two direct voltage terminals for providing a base direct voltage for the two MOSFET elements, two gate terminals for providing two control voltages for the two MOSFET elements, a measurement output for outputting an output voltage, and an alternating voltage source for providing an alternating voltage, the method may include providing the control voltages, the base direct voltage, and the alternating voltage, superimposing the alternating voltage with the base direct voltage, capturing the output voltage at the measurement output of the IGBT driver, and determining the temperature of the respective MOSFET elements from the captured output voltage.

20 Claims, 3 Drawing Sheets

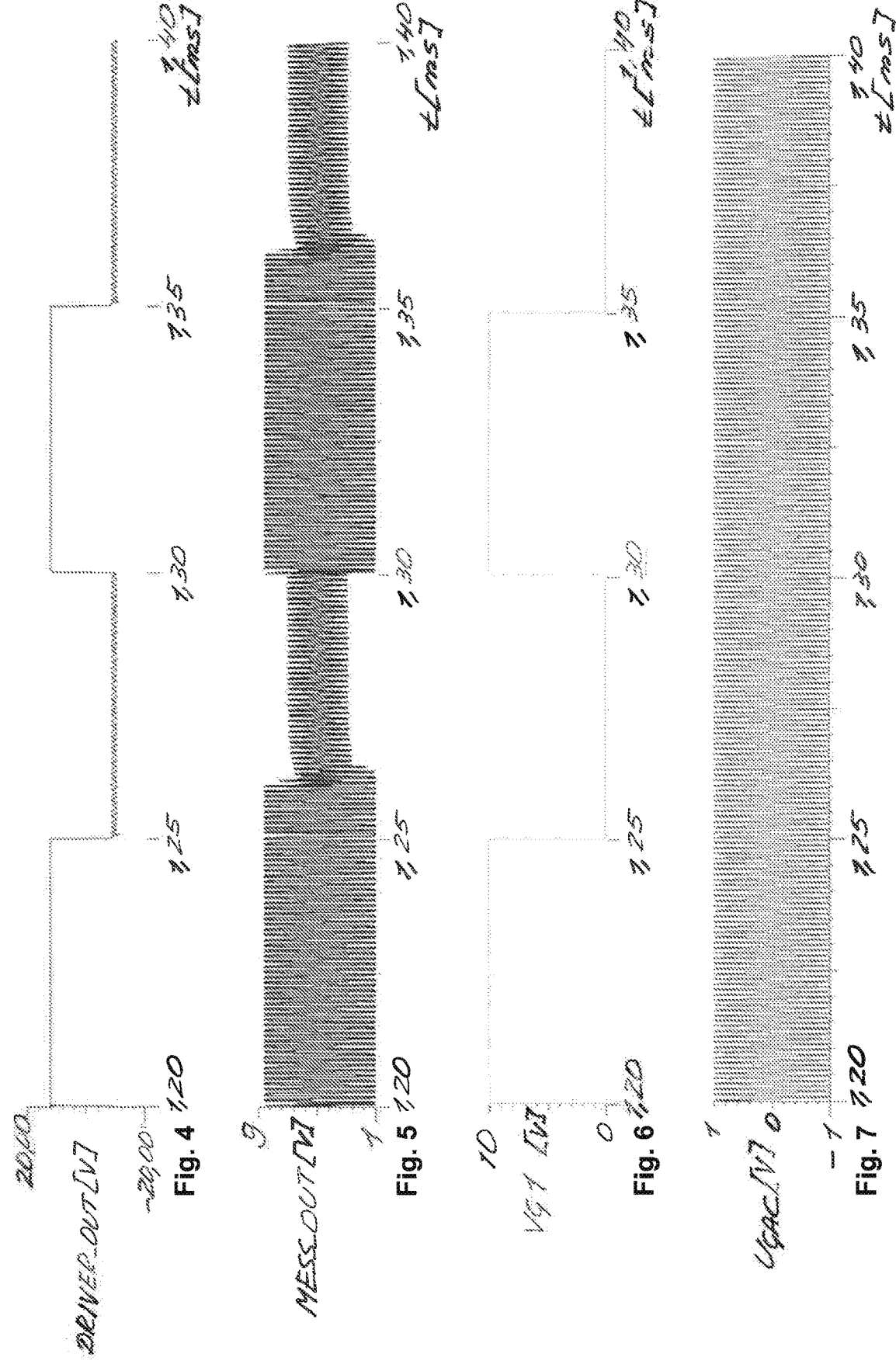

METHOD FOR DETERMINING A TEMPERATURE OF AN IGBT DRIVER

CROSS-REFERENCE TO RELATED APPLICATIONS

This application claims priority to German Patent Application No. DE 10 2022 202 413.3, filed on Mar. 10, 2022, the contents of which is hereby incorporated by reference in its entirety.

TECHNICAL FIELD

The invention relates to a method for determining a temperature of an IGBT driver. The invention also relates to the IGBT driver.

BACKGROUND

An IGBT driver is known, for example, from DE 10 2014 204 648 A1. An IGBT driver (IGBT: Insulated-Gate Bipolar Transistor) usually has several MOSFETs (MOSFET: Metal-Oxide-Semiconductor Field-Effect Transistor), which are interconnected. In the case of the MOSFETs, high power losses are created during operation, whereby the MOSFETs heat up. If the maximally permissible component temperature—for example junction temperature—is exceeded during the heat-up, a thermal failure of the MOSFETs occurs. To prevent the thermal failure, the temperature of the MOSFETs is captured, for example indirectly, via an NTC thermistor (NTC: Negative Temperature Coefficient). It is a disadvantage that a monitoring of this type of the temperature is inaccurate and slow. This is why a correspondingly large safety factor is to be provided in order to securely rule out the thermal failure of the MOSFETs.

The MOSFETs thereby comprise an internal gate resistor element, which has a temperature-dependent resistance and which is located spatially directly at an active region of the MOSFET. If the resistance-temperature characteristic curve of the internal gate resistor element is known, the resistance of the internal gate resistor element can be measured, and the temperature of the active region of the MOSFET can be determined therefrom. For the IGBT driver, an input/output signal is then provided for the power semiconductors, and an alternating voltage for the temperature measurement. The alternating voltage and the input/output signal are operated alternately. A voltage drop of the alternating voltage is measured at an external resistor during the temperature measurement, and the temperature of the internal gate resistor element is determined therefrom. It is a disadvantage that exact switching and dead times of the IGBT driver have to be adhered to here in order to design the control of the MOSFET. The determined voltage drop is very low and the evaluation or the accuracy, respectively, of the determined temperature is thus reduced.

SUMMARY

It is thus the object of the invention to specify an improved or at least alternative method for determining a temperature of an IGBT driver and an improved or at least alternative embodiment of the IGBT driver, in the case of which the described disadvantages are overcome.

This object is solved according to the invention by means of the subject matter of the independent claim(s). Advantageous embodiments are subject matter of the dependent claim(s).

A method according to the invention is provided for determining a temperature of an IGBT driver (IGBT: Insulated-Gate Bipolar Transistor). The IGBT driver thereby comprises two MOSFET elements (MOSFET: Metal-Oxide-Semiconductor Field-Effect Transistor), which are interconnected to form a driver. The IGBT driver additionally comprises two direct voltage terminals for providing a base direct voltage for the two MOSFET elements, two gate terminals for providing two control voltages, which are temporally complementary to one another, for the two MOSFET elements, and a measurement output for outputting an output voltage. The IGBT driver additionally has an alternating voltage source for providing an alternating voltage. The control voltages and the base direct voltage for the two MOSFET elements and the alternating voltage are provided in the method. The alternating voltage and the base direct voltage are thereby provided permanently and always superimposed. The output voltage is additionally captured at the measurement output of the IGBT driver. The temperature of the respective MOSFET element of the IGBT driver is subsequently determined from the captured output voltage.

The two control voltages are applied to the gate terminals of the IGBT driver and are conducted to the two MOSFET elements. The two gate terminals of the IGBT driver are thereby formed by means of the respective gate terminals of the two MOSFET elements. The one control voltage is thus applied to the gate terminal of the one MOSFET element, and the other control voltage is applied to the gate terminal of the other MOSFET element. The two control voltages are thereby temporally complementary, so that the one MOSFET element and the other MOSFET element are alternately switched to high impedance. The respective control voltage can be depicted in particular by means of a square-wave voltage signal. At a predetermined point in time, only one of the two control voltages thereby each has a value, which is different from zero. By means of the two MOSFET elements or the driver formed by the MOSFET elements, respectively, the base direct voltage is processed into the output voltage, which can represent a control voltage for further external elements—in particular an external IGBT element. The output voltage can be depicted in particular by means of a square-wave voltage signal. The alternating voltage can in particular be of high frequency. The frequency of the alternating voltage can in particular be several times higher than the frequency of the respective control voltage.

The output voltage thereby comprises or reflects, respectively, or includes, respectively, a voltage drop, which is a function of the temperature of the respective MOSFET element or of the temperature-dependent change of a resistance of the respective MOSFET element, respectively, or of the temperature-dependent change of a resistance of a respective internal gate resistor element of the MOSFET elements, respectively. Based on this, the temperature of the respective MOSFET elements can be determined. The alternating voltage and the base direct voltage are thereby not superimposed temporarily, but permanently or continuously, respectively, or constantly, respectively. The problem of an accurate adherence to the switching times in the IGBT driver can thus be bypassed. A component—such as, for example, an additional MOSFET element—for activating and for deactivating the alternating voltage source can advantageously be forgone thereby. Additional components—such as, for example, NTC thermistors (NTC: Negative Temperature Coefficient)—are also not required for determining the temperature at the MOSFET elements of the IGBT driver. The method according to the invention can advantageously be used in various applications after a slight adaptation.

It can advantageously be provided that the output voltage is captured as a measurement voltage by means of a sensor circuit of the IGBT driver at a resistor element of the IGBT driver. The temperature at the respective MOSFET element of the IGBT driver is then subsequently determined from the captured measurement voltage. The sensor circuit can thereby analyze the measurement voltage and can determine the current temperature at the respective MOSFET elements of the IGBT driver therefrom. The sensor circuit is advantageously designed for capturing and for evaluating the measurement voltage and can have corresponding electronic structural components.

It can advantageously be provided that a temperature-dependent change of a temperature-dependent resistance of a respective internal gate resistor element of the respective MOSFET elements is captured via the output voltage. The respective gate resistor element thereby has the temperature-dependent resistance and is located spatially directly at an active region of the respective MOSFET element or of the IGBT driver, respectively. If the temperature of the active region of the respective MOSFET element or of the IGBT driver, respectively, changes, the temperature of the respective gate resistor element and its resistance changes. The temperature of the respective gate resistor element and thus of the active region of the respective MOSFET element and thus of the IGBT driver can now be determined from the mentioned change of the resistance.

The output voltage can—as already described above—be captured by means of a sensor circuit of the IGBT driver at a resistor element of the IGBT driver as a measurement voltage. The temperature at the respective MOSFET elements can thereby be determined from a voltage drop of the measurement voltage. The voltage drop is thereby a function of the temperature of the respective MOSFET element or of the temperature-dependent change of a resistance of the respective MOSFET element, respectively, or of the temperature-dependent change of a resistance of a respective internal gate resistor element of the MOSFET elements, respectively. Based on this, the temperature of the respective MOSFET elements can be determined. The temperature at the MOSFET elements of the IGBT driver can thereby be determined from a resistance-temperature characteristic curve of the respective internal gate resistor element. The determined temperature of the respective internal gate resistor element thereby corresponds to the temperature of the active region of the MOSFET elements.

The output voltage can—as already described above—be captured by means of a sensor circuit of the IGBT driver at a resistor element of the IGBT driver as a measurement voltage. A phase shift between the measurement voltage and the alternating voltage can additionally be determined, and the captured measurement voltage can be intensified thereby. For this purpose, a difference between the measurement voltage and the alternating voltage can be formed. A change of the amplitude of the measurement voltage is thus intensified as a function of the temperature of the MOSFET elements. By means of an additional evaluation of the phase shift, a better differentiation of the output voltage can be attained.

The invention also relates to an IGBT driver. The IGBT driver has two MOSFET elements, which are interconnected to form a driver, and an alternating voltage source for providing an alternating voltage. The IGBT driver thereby has two direct voltage terminals for feeding a base direct voltage to the IGBT driver, two gate terminals for feeding two control voltages to the two MOSFET elements, and one measurement output for outputting an output voltage from the IGBT driver. The alternating voltage source is thereby arranged in such a way that the alternating voltage provided by the alternating voltage source can always be superimposed with the base direct voltage. According to the invention, the IGBT driver is designed and/or programmed for carrying out the above-described method. To avoid repetitions, reference is made at this point to the above statements. The alternating voltage source can advantageously be connected between one of the direct voltage terminals and one of the MOSFET elements. The IGBT driver can advantageously have a resistor element and a sensor circuit. The sensor circuit can be designed to capture and evaluate the output voltage, which is captured as a measurement voltage at the resistor element.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically

FIG. 4 shows a diagram with a temporal course of an output voltage of the IGBT driver according to the invention;

FIG. 5 shows a diagram with a temporal course of a measurement voltage of the IGBT driver according to the invention;

FIG. 6 shows a diagram with a temporal course of a control voltage at one of the gate terminals of the IGBT driver according to the invention;

FIG. 7 shows a diagram with a temporal course of an alternating voltage of an alternating voltage source of the IGBT driver according to the invention.

DETAILED DESCRIPTION

Figure 1:
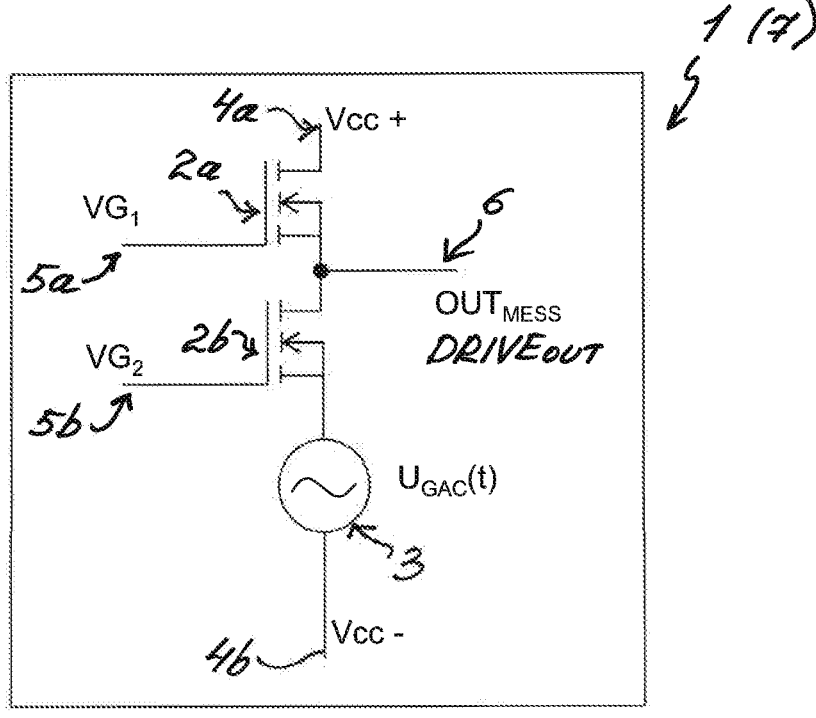
FIG. 1 shows a circuit diagram of an IGBT driver according to the invention.

FIG. 1 shows a circuit diagram of an IGBT driver 1 according to the invention. The IGBT driver 1 thereby has two MOSFET elements 2a and 2b and an alternating voltage source 3. The MOSFET element 2a is assigned to the high side here, and the MOSFET element 2b is assigned to the low side here. The IGBT driver 1 additionally has two direct voltage terminals 4a and 4b, two gate terminals 5a and 5b, and a measurement output 6. The alternating voltage source 3 thereby provides a high-frequency alternating voltage U_GAC. A base direct voltage V_CC is provided at the direct voltage terminals 4a and 4b. Control voltages VG1 and VG2 are provided at the gate terminals 5a and 5b. An output voltage DRIVE_OUT is output at the measurement output 6.

The IGBT driver 1 is thereby designed and/or programmed for carrying out a method 7 according to the invention. The method 7 is provided for determining a temperature of the IGBT driver 1. In the method 7, the alternating voltage U_GAC and the base direct voltage V_CC are provided permanently and superimposed. Neither the alternating voltage U_GAC nor the base direct voltage V_CC are thus deactivated.

The output voltage DRIVE_OUT is measured at the measurement output 6 as a measurement voltage OUT_MESS, as will be described in more detail below on the basis of FIG. 3. The output voltage DRIVE_OUT reproduces or reflects, respectively, or includes, respectively, a temperature-dependent change of a temperature-dependent resistance of an internal gate resistor element—not shown here—of the respective MOSFET element 2a or 2b, respectively. The temperature of the internal gate resistor element and therefore of the respective MOSFET element 2a or 2b, respectively, can be determined from the measurement voltage OUT_MESS and based on a known resistance-temperature characteristic curve of the internal gate resistor element.

Figure 3:
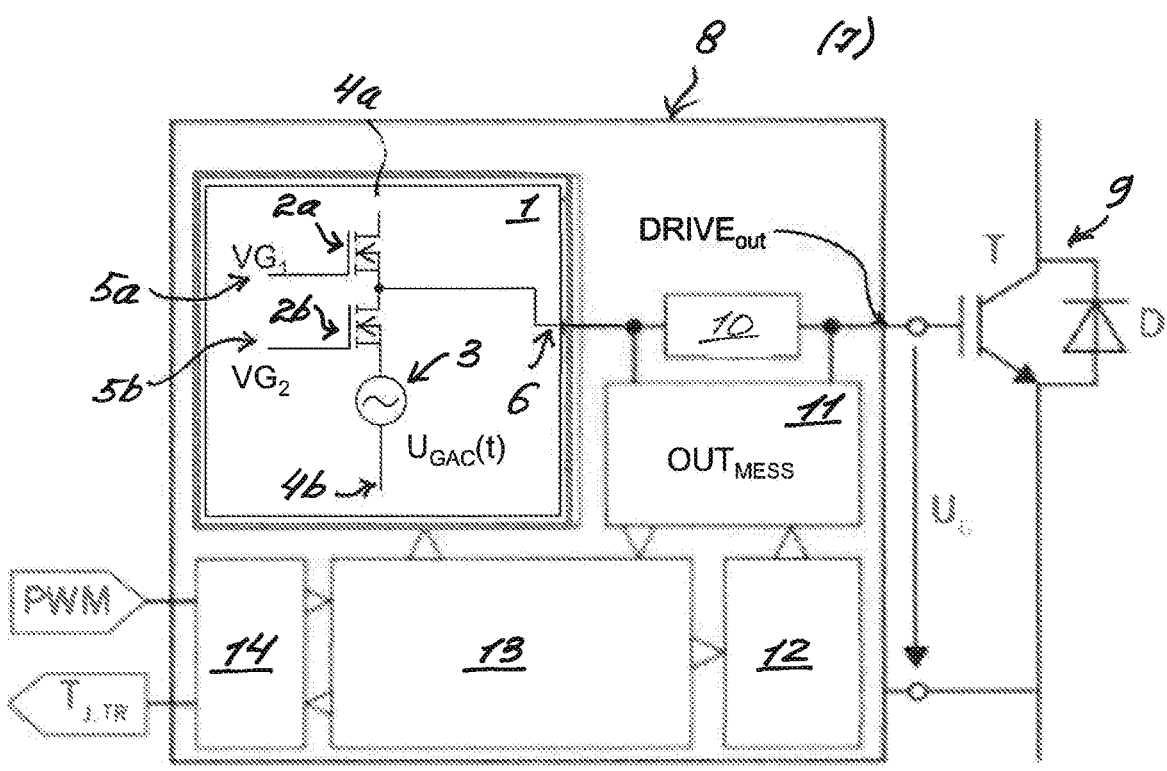
FIG. 3 shows a circuit diagram of an IGBT driver circuit with the IGBT driver according to the invention.

FIG. 3 shows a circuit diagram of an IGBT driver circuit 8 with the IGBT driver 1 according to the invention. The IGBT driver circuit 8 or the IGBT driver 1, respectively, thereby provides the output voltage DRIVE_OUT as a control voltage U_G for an external IGBT element 9. The IGBT driver 1 thereby comprises a resistor 10 and a sensor circuit 11. The sensor circuit 11 thereby captures the output voltage OUT-MESS at the resistor 10 as the measurement voltage OUT_MESS and determines therefrom the temperature T_J,TR of the internal gate resistor element and therefore of the respective MOSFET element 2a or 2b, respectively. The IGBT driver circuit 8 additionally comprises a calibration circuit 12, a control device 13, and in interface 14. The IGBT driver circuit 8 is thereby controlled by means of PWM (PWM: Pulse Width Modulation) and outputs the temperature T_J,TR via the interface 14.

Figure 2:
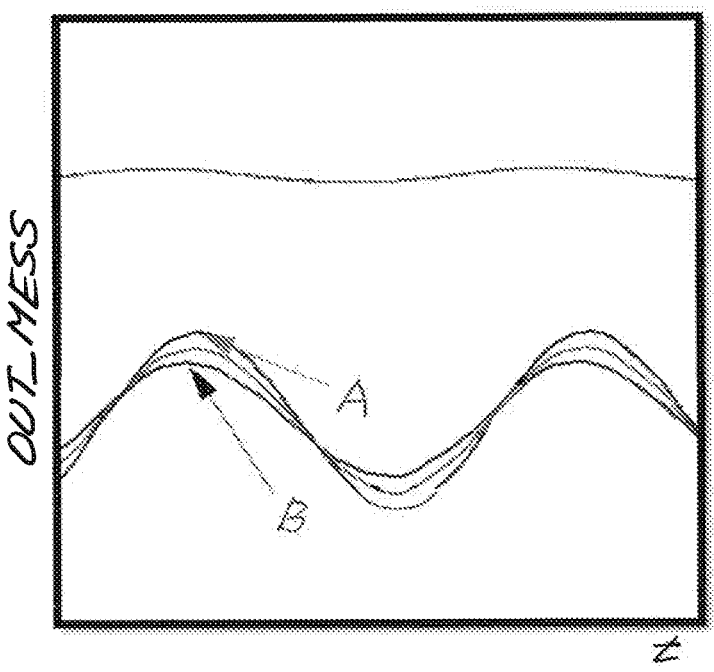
FIG. 2 shows a comparison diagram with a temporal course of a measurement voltage in the IGBT driver according to the invention.

FIG. 2 shows a comparison diagram with a temporal course of the measurement voltage OUT_MESS. The measurement voltage OUT_MESS identified with A corresponds to a resistance of 6.5 Ohm, and the measurement voltage OUT_MESS identified with B corresponds to a resistance of 9.5 Ohm.

FIG. 4 shows a diagram with a temporal course of the output voltage DRIVER_OUT of the IGBT driver 1. The output voltage DRIVER_OUT is thereby provided as the control voltage U_G for the external IGBT element 9.

FIG. 5 shows a diagram with a temporal course of the measurement voltage OUT_MESS, which was captured at the resistor 10 by means of the sensor circuit 11. The measurement voltage OUT_MESS thereby includes the temperature-dependent change of a temperature-dependent resistance of the internal gate resistor element of the respective MOSFET element 2a or 2b, respectively.

FIG. 6 shows a diagram with a temporal course of the control voltage VG1 at the gate terminal 4a of the IGBT driver 1. The control voltage VG1 is depicted by means of a square-wave voltage signal. The control voltages VG1 and VG2 are temporally complementary to one another, so that the control voltage VG1 at the MOSFET element 2a (high side) is different from zero and the control voltage VG2 at the MOSFET element 2b (low side) equals zero, and vice versa, at a predetermined point in time.

FIG. 7 shows a diagram with a temporal course of the alternating voltage U_GAC of the alternating voltage source 3 of the IGBT driver 1. Compared to the control voltages VG1 and VG2, the alternating voltage U_GAC is of high frequency or has a frequency, which is several times higher compared to the control voltages VG1 and VG2, respectively.

The invention claimed is:

1. A method for determining a temperature of an Insulated-Gate Bipolar Transistor ("IGBT") driver, the IGBT driver includes two Metal-Oxide-Semiconductor Field-Effect Transistor ("MOSFET") elements, two direct voltage terminals for providing a base direct voltage for the two MOSFET elements, two gate terminals for providing two control voltages for the two MOSFET elements, a measurement output for outputting an output voltage, and an alternating voltage source for providing an alternating voltage, the method comprising:

providing the control voltages, the base direct voltage, and the alternating voltage;

superimposing the alternating voltage with the base direct voltage, wherein the alternating voltage and the base direct voltage are provided permanently and are always superimposed;

capturing the output voltage at the measurement output of the IGBT driver; and determining the temperature of the respective MOSFET elements from the captured output voltage.

2. The method according to claim 1, wherein the output voltage is captured by a sensor circuit of the IGBT driver at a resistor element as a measurement voltage; and the temperature at the respective MOSFET element is determined from the captured measurement voltage.

3. The method according to claim 1, wherein a temperature-dependent change of a temperature-dependent resistance of a respective internal gate resistor element of the respective MOSFET elements is captured via the output voltage.

4. The method according to claim 1, wherein the output voltage is captured as a measurement voltage by a sensor circuit of the IGBT driver at a resistor element of the IGBT driver; and the temperature at the respective MOSFET elements is determined from a voltage drop of the measurement voltage.

5. The method according to claim 4, wherein the temperature at the MOSFET elements based on the voltage drop of the measurement voltage is determined from a resistance-temperature characteristic curve of the respective internal gate resistor element.

6. The method according to claim 1, wherein the output voltage is captured as a measurement voltage by a sensor circuit of the IGBT driver at a resistor element of the IGBT driver; and a phase shift between the measurement voltage and the alternating voltage is determined and the captured measurement voltage is intensified thereby.

7. The method according to claim 6, wherein a difference between the measurement voltage and the alternating voltage is formed for the evaluation.

8. An Insulated-Gate Bipolar Transistor ("IGBT") driver, comprising:

two Metal-Oxide-Semiconductor Field-Effect Transistor ("MOSFET") elements interconnected to form a driver;

an alternating voltage source for providing an alternating voltage;

two direct voltage terminals for feeding a base direct voltage to the IGBT driver;

two gate terminals for feeding two control voltages to the two MOSFET elements; and a measurement output for outputting an output voltage from the IGBT driver;

wherein the alternating voltage source is arranged such that the alternating voltage provided by the alternating voltage source can always be superimposed with the base direct voltage; and the IGBT driver is configured for carrying out the method according to claim 1.

9. The IGBT driver according to claim 8, wherein the alternating voltage source is connected between one of the direct voltage terminals and one of the MOSFET elements.

10. The IGBT driver according to claim 8, wherein the IGBT driver has a resistor element and a sensor circuit for capturing and evaluating the output voltage captured as a measurement voltage at the resistor element.

11. A method, comprising:

providing Insulated-Gate Bipolar Transistor ("IGBT") driver with two Metal-Oxide-Semiconductor Field-Effect Transistor ("MOSFET") elements, two direct voltage terminals for providing a base direct voltage for the two MOSFET elements, two gate terminals for providing two control voltages for the two MOSFET elements, a measurement output for outputting an output voltage, and an alternating voltage source for providing an alternating voltage;

providing the control voltages, the base direct voltage, and the alternating voltage;

superimposing the alternating voltage with the base direct voltage;

capturing the output voltage at the measurement output of the IGBT driver; and determining the temperature of the respective MOSFET elements from the captured output voltage.

12. The method according to claim 11, wherein the output voltage is captured by a sensor circuit of the IGBT driver at a resistor element as a measurement voltage; and the temperature at the respective MOSFET element is determined from the captured measurement voltage.

13. The method according to claim 11, wherein a temperature-dependent change of a temperature-dependent resistance of a respective internal gate resistor element of the respective MOSFET elements is captured via the output voltage.

14. The method according to claim 11, wherein the output voltage is captured as a measurement voltage by a sensor circuit of the IGBT driver at a resistor element of the IGBT driver; and the temperature at the respective MOSFET elements is determined from a voltage drop of the measurement voltage.

15. The method according to claim 14, wherein the temperature at the MOSFET elements based on the voltage drop of the measurement voltage is determined from a resistance-temperature characteristic curve of the respective internal gate resistor element.

16. The method according to claim 11, wherein the output voltage is captured as a measurement voltage by a sensor circuit of the IGBT driver at a resistor element of the IGBT driver; and a phase shift between the measurement voltage and the alternating voltage is determined and the captured measurement voltage is intensified thereby.

17. The method according to claim 16, wherein a difference between the measurement voltage and the alternating voltage is formed for the evaluation.

18. An Insulated-Gate Bipolar Transistor ("IGBT") driver, comprising:

two Metal-Oxide-Semiconductor Field-Effect Transistor ("MOSFET") elements interconnected to form a driver;

an alternating voltage source for providing an alternating voltage;

two direct voltage terminals for feeding a base direct voltage to the IGBT driver;

two gate terminals for feeding two control voltages to the two MOSFET elements; and a measurement output for outputting an output voltage from the IGBT driver;

wherein the alternating voltage source is configured such that the alternating voltage provided by the alternating voltage source is superimposed with the base direct voltage.

19. The IGBT driver according to claim 18, wherein the alternating voltage source is connected between one of the direct voltage terminals and one of the MOSFET elements.

20. The IGBT driver according to claim 18, wherein the IGBT driver has a resistor element and a sensor circuit for capturing and evaluating the output voltage captured as a measurement voltage at the resistor element.

\* \* \* \* \*